(12) United States Patent
Sekihara et al.

(10) Patent No.: US 10,029,560 B2
(45) Date of Patent: Jul. 24, 2018

(54) FUEL SUPPLY APPARATUS

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Atsushi Sekihara, Kiyosu (JP); Yoshinari Hiramatsu, Kiyosu (JP); Shinji Shimokawa, Seto (JP); Toru Shirasaki, Nisshin (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/070,021

(22) Filed: Mar. 15, 2016

(65) Prior Publication Data

US 2016/0272063 A1     Sep. 22, 2016

(30) Foreign Application Priority Data

Mar. 19, 2015  (JP) ................................. 2015-055763
Mar. 19, 2015  (JP) ................................. 2015-055764

(51) Int. Cl.
*B60K 15/04*     (2006.01)
*F02M 37/00*     (2006.01)
*B60K 15/035*    (2006.01)

(52) U.S. Cl.
CPC .... *B60K 15/04* (2013.01); *B60K 2015/03538* (2013.01); *B60K 2015/047* (2013.01); *B60K 2015/0464* (2013.01); *F02M 37/0082* (2013.01)

(58) Field of Classification Search
CPC .................. B60K 15/04; B60K 15/047; B60K 2015/03538

(Continued)

(56) References Cited

U.S. PATENT DOCUMENTS 4,300,699 A  *  11/1981  Anhegger .............. B60K 15/04
                                                 137/588
4,722,454 A  *  2/1988   Fischer .................. B60K 15/04
                                                 137/587

(Continued)

FOREIGN PATENT DOCUMENTS

CN       101396962 A    4/2009
JP       2002-283855 A  10/2002

(Continued)

OTHER PUBLICATIONS

Office Action dated Dec. 5, 2017 issued in corresponding CN patent application No. 201610153600.0 (and English translation).

(Continued)

*Primary Examiner* — Timothy L Maust
(74) *Attorney, Agent, or Firm* — Posz Law Group, PLC

(57) ABSTRACT

An object is to provide a fuel supply apparatus that is configured to cause fuel vapor generated by vaporization of a fuel circulated in a fuel tank to be smoothly joined with the supplied fuel. The fuel supply apparatus comprises a filler neck body that is configured to include a hollow fuel passage-forming portion arranged to define a fuel passage and a breather port; a nozzle guide that is placed inside of the fuel passage-forming portion and is configured to introduce a fueling nozzle; a guide portion that is configured to introduce an inflow gas flowing in from the breather port, to the fuel passage via an outer circumferential space; and a rib that is provided between the guide portion and a lower end in the first direction of the nozzle guide and is configured to divide the inflow gas introduced through the fuel passage.

13 Claims, 13 Drawing Sheets

(58) Field of Classification Search
USPC .................................. 141/285, 350; 220/86.2
See application file for complete search history.

(56) References Cited

U.S. PATENT DOCUMENTS

| | | | | |
|---|---|---|---|---|
| 5,040,575 | A * | 8/1991 | Oeffling | B60K 15/03519 137/588 |
| 5,839,489 | A * | 11/1998 | Ganachaud | B60K 15/04 141/301 |
| 6,705,481 | B2 * | 3/2004 | Temmesfeld | B60K 15/0406 141/350 |
| 7,997,306 | B2 * | 8/2011 | Kobayashi | B60K 15/04 141/286 |
| 7,997,307 | B2 * | 8/2011 | Benjey | B60K 15/04 141/350 |
| 8,096,332 | B2 * | 1/2012 | Hagano | B60K 15/04 141/285 |
| 8,220,508 | B2 | 7/2012 | Rongstock | |

| | | |
|---|---|---|
| 2002/0134461 | A1 | 9/2002 Furuta |
| 2009/0084464 | A1 | 4/2009 Hagano |
| 2015/0251532 | A1 | 9/2015 Kato et al. |

FOREIGN PATENT DOCUMENTS

| | | |
|---|---|---|
| JP | 2009-083569 A | 4/2009 |
| JP | 2010-195062 A | 9/2010 |
| JP | 2014-080040 A | 5/2014 |
| JP | 2015-143043 A | 8/2015 |
| JP | 2015-227112 A | 12/2015 |

OTHER PUBLICATIONS

Office Action dated Mar. 23, 2017 issued in corresponding JP patent application No. 2015-055763 (and English translation).
Office Action dated Mar. 23, 2017 issued in corresponding JP patent application No. 2015-055764 (and English translation).

* cited by examiner

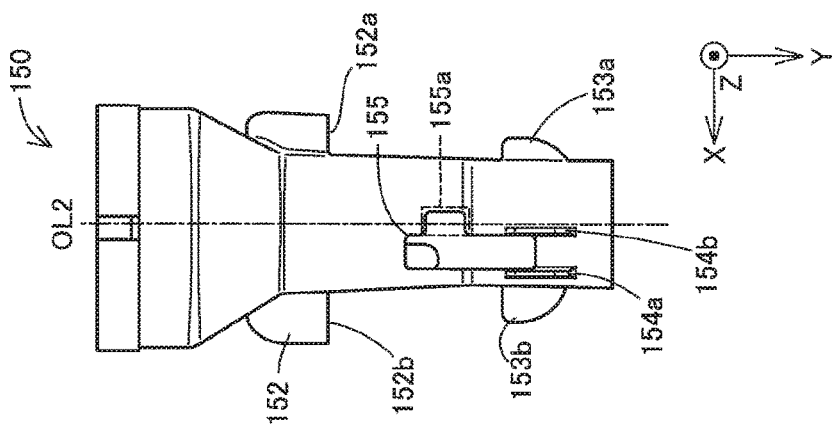
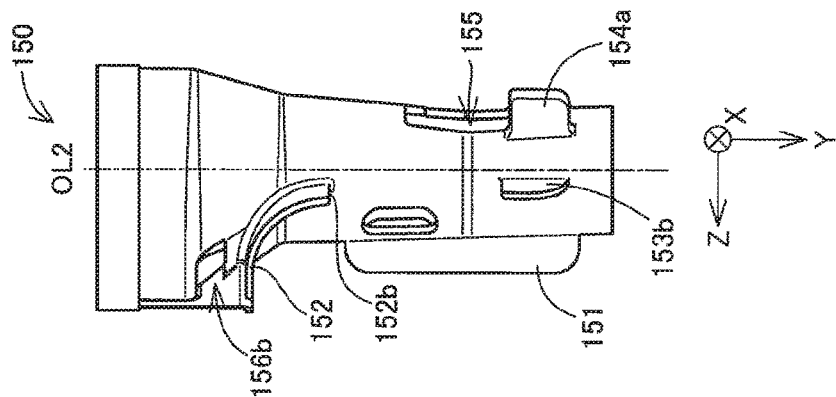
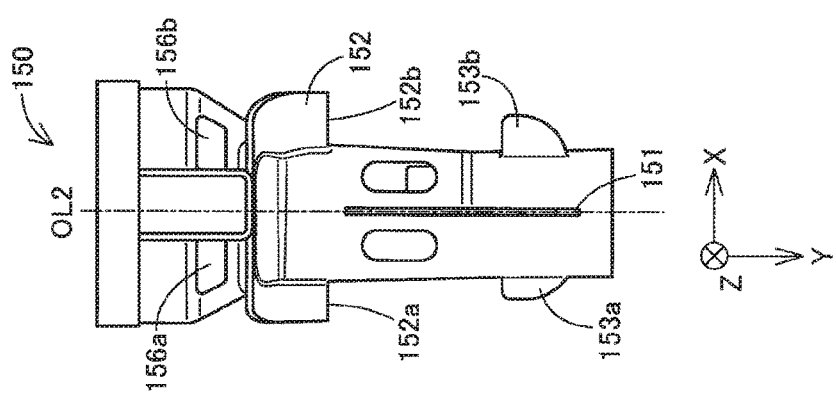
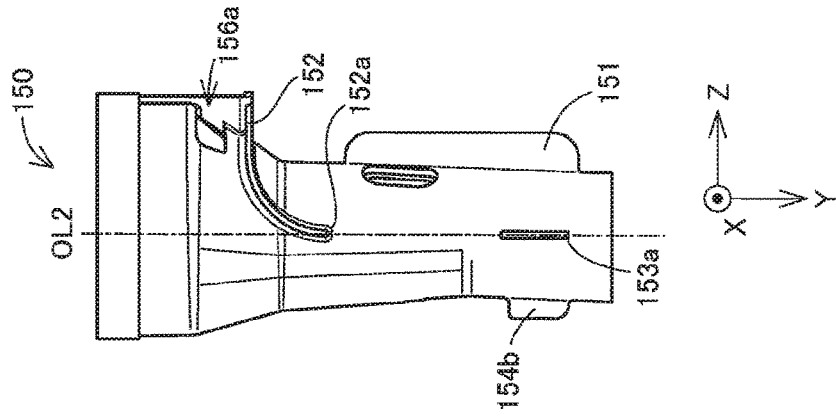

FUEL SUPPLY APPARATUS

CROSS-REFERENCE TO RELATED APPLICATIONS

The present application claims priorities from Japanese patent applications P2015-55763 and P2015-55764 filed on Mar. 19, 2015, the content of which is hereby incorporated by reference into this application.

TECHNICAL FIELD

The present invention relates to a fuel supply apparatus.

DESCRIPTION OF RELATED ART

A fuel supply apparatus having an opening provided in the middle of a fuel passage to open and close the fuel passage has been known as a fuel supply apparatus configured to introduce a supplied fuel to a fuel tank of a motor vehicle. JP 2009-83569A describes a filler neck including a tubular body that is configured to form a fuel passage and a breather port that is arranged to branch off from the tubular body and to connect with a circulation path configured to circulate the fuel vapor generated in the fuel tank to the fuel passage. JP 2010-195062A describes a fuel supply apparatus having a filler neck including a tubular body configured to form a fuel passage and a breather port, in which part of the tubular body is recessed toward the fuel passage side to expand the passage through which the circulated fuel vapor passes through. U.S. Pat. No. 8,220,508 describes a nozzle guide that is placed inside of a filler neck to introduce a fueling nozzle toward a fuel tank and to suppress the fuel vapor generated by vaporization in the fuel tank and splash of the fuel during furling from leaking out of the vehicle. JP 2010-195062A also describes a cylindrical nozzle guide having a plurality of openings formed to make outside and inside of the nozzle guide communicate with each other.

In the fuel supply apparatuses described in JP 2009-83569A and in JP 2010-195062A, the fuel vapor generated in the fuel tank may not smoothly circulate through the breather port to the fuel tank and may thus fail to reduce the internal pressure of the fuel tank. In this case, the supplied fuel is unlikely to be flowed smoothly by the internal pressure of the fuel tank as the resistance. In the fuel supply apparatuses described in JP 2009-83569A and in JP 2010-195062A, the fuel vapor is circulated through the fuel passage and the fuel tank without being released to the atmosphere. This may lead to poor fueling performance that does not allow the circulated fuel vapor to be smoothly joined with the supplied fuel and thereby fails to achieve smooth fueling.

A fueling nozzle used to supply the fuel to the fuel supply apparatus may be provided with a gas sensor that is placed on a leading end of the fueling nozzle inserted into the fuel supply apparatus and is configured to prevent overflow of the fuel supplied to the fuel supply apparatus. There is, however, a possibility that some positional relationship of the gas sensor provided on the fueling nozzle to the nozzle guide of the fuel supply apparatus in which the fueling nozzle is inserted detects the fuel supplied to the fuel supply apparatus with some delay and causes the fuel to be overflowed from the fuel supply apparatus. Although JP 2009-83569A and U.S. Pat. No. 8,220,508 disclose the nozzle guide configured to introduce the fueling nozzle inserted into the fuel supply apparatus toward the fuel tank. These discloses, however, still have a room for improvement in preventing overflow of the fuel supplied to the fuel supply apparatus. With regard to the technical field of the fuel supply apparatus, other needs include downsizing, cost reduction, resource saving, easy manufacture and improvement of usability.

SUMMARY

In order to solve at least part of the problems described above, the invention may be implemented by the following aspects or configurations.

(1) According to one aspect of the invention, there is provided a fuel supply apparatus. This fuel supply apparatus comprises a filler neck body that is configured to include a hollow fuel passage-forming portion arranged to define a fuel passage which a supplied fuel passes through, and a breather port arranged to branch off from the fuel passage-forming portion; a nozzle guide that is placed inside of the fuel passage-forming portion and is configured to introduce a fueling nozzle for supplying the fuel in a first direction from a body opening of the filler neck body in which the fueling nozzle is inserted toward a fuel tank; a guide portion that is configured to introduce an inflow gas flowing in from the breather port, to the fuel passage via an outer circumferential space defined by the fuel passage-forming portion and an outer circumferential surface of the nozzle guide; and a rib that is provided between the guide portion and a lower end in the first direction of the nozzle guide and is configured to divide the inflow gas introduced through the fuel passage. In the fuel supply apparatus of this aspect, the rib rectifies the fuel vapor, so that the fuel vapor is smoothly joined with the fuel. This enables the fuel vapor to be smoothly joined with the fuel without causing turbulence and improves the fueling performance of the fuel supplied from the fueling nozzle. This configuration also causes the fuel vapor introduced to downstream by the guide portion to be diffused in the outer circumferential space. This suppresses accumulation of the fuel vapor and suppresses turbulence of the fuel vapor.

(2) In the fuel supply apparatus of the above aspect, the guide portion may be provided to prevent the inflow gas from flowing in a second direction reverse to the first direction through the breather port. The nozzle guide may have a hole that is provided upstream of the guide portion to make the fuel passage communicate with the outer circumferential space and is formed on a side where the guide portion is located with respect to an axis of the nozzle guide. The fuel supply apparatus of this aspect causes the air to be released out of the fuel supply apparatus in the course of supplying the fuel from the fueling nozzle to the fuel supply apparatus.

(3) In the fuel supply apparatus of the above aspect, the guide portion and the rib may be formed integrally with the nozzle guide to be away from each other on an outer circumference of the nozzle guide. This configuration enables the guide portion and the rib to be readily produced at the designed positions. This configuration also reduces the total number of components placed inside of the filler neck body and facilitates manufacture of the fuel supply apparatus.

(4) In the fuel supply apparatus of the above aspect, the rib may be formed along an axial direction of the nozzle guide. This configuration of the fuel supply apparatus enables the fuel vapor generated by vaporization of the fuel to be more smoothly introduced to the fuel tank, compared with a configuration that the rib is not formed along the axial direction.

(5) In the fuel supply apparatus of the above aspect, the guide portion may be formed to be bent toward the first direction. The fuel supply apparatus of this aspect causes the fuel vapor to be introduced to downstream with suppressing turbulence from being generated in the fuel vapor joined with the supplied fuel.

(6) According to another aspect, there is provided a fuel supply apparatus. This fuel supply apparatus comprises a hollow filler neck body that is configured to define a fuel passage which a supplied fuel passes through; and a nozzle guide that is placed inside of the filler neck body and is configured in a tubular form to introduce a fueling nozzle for supplying the fuel in a first direction from a body opening of the filler neck body in which the fueling nozzle is inserted toward a fuel tank. The nozzle guide has an opening configured to make the fuel passage communicate with an outer circumferential space that is defined by an outer circumferential surface of the nozzle guide and an inner circumferential surface of the filler neck body. The opening includes an enlarged opening portion that is open wider than a remaining portion along a circumferential direction. In the fuel supply apparatus of this aspect, the nozzle guide has the enlarged opening portion that is wide open in the circumferential direction. Even in the case of rotation of the fueling nozzle inserted in the fuel supply apparatus, this configuration enables a gas sensor for the fueling nozzle to quickly detect the liquid level of the fuel supplied to the fuel supply apparatus at a predetermined position.

(7) In the fuel supply apparatus of the above aspect, the filler neck body may have a breather port arranged to branch off from the fuel passage. The enlarged opening portion may be formed on an opposite side to a location at which the breather port branches off from the fuel passage with respect to an axial direction of the fuel passage. The fuel supply apparatus of this aspect enables the gas sensor for the fueling nozzle to detect the liquid level of the supplied fuel at the lower position and thus more effectively prevents overflow of the fuel supplied to the fuel supply apparatus.

(8) In the fuel supply apparatus of the above aspect, the enlarged opening portion may be formed on a side of the nozzle guide where the fueling nozzle is inserted.

(9) In the fuel supply apparatus of the above aspect, the enlarged opening portion may be formed on a fuel tank-side of the nozzle guide.

(10) In the fuel supply apparatus of the above aspect, the nozzle guide may have a protrusion formed along a fuel tank-side end of the opening. In the fuel supply apparatus of this aspect, the protrusion introduces the supplied fuel to the opening. This configuration enables the gas sensor for the fueling nozzle to more quickly detect the liquid level of the supplied fuel and thereby more effectively prevents overflow of the fuel supplied to the fuel supply apparatus.

The invention may be implemented by any of various aspects other than the fuel supply apparatus, for example, a motor vehicle with the fuel supply apparatus mounted thereon and a method of manufacturing the fuel supply apparatus.

According to one aspect of the invention, the rib serves to divide the flow of the fuel vapor. This enables the fuel vapor to be smoothly flowed inside of the fuel supply apparatus with suppressing turbulence from being generated in the fuel vapor in the middle of circulation. This accordingly suppresses an increase in internal pressure of the fuel tank and enables the fuel supplied from the fueling nozzle to be smoothly flowed into the fuel tank. Rectifying the fuel vapor by the rib enables the fuel vapor to be smoothly joined with the fuel. This enables the fuel vapor to be smoothly joined with the fuel without causing turbulence and improves the fueling performance of the fuel supplied from the fueling nozzle. This configuration also causes the fuel vapor introduced to downstream by the guide portion to be diffused in the outer circumferential space. This suppresses accumulation of the fuel vapor and suppresses turbulence of the fuel vapor.

According to another aspect of the invention, the nozzle guide has the enlarged opening portion that is wide open in the circumferential direction. Even in the case of rotation of the fueling nozzle inserted in the fuel supply apparatus, this configuration enables the gas sensor for the fueling nozzle to quickly detect the liquid level of the fuel supplied to the fuel supply apparatus at the predetermined position.

BRIEF DESCRIPTION OF DRAWINGS

FIG. 7A is a left side view illustrating a nozzle guide;
FIG. 7B is a front view illustrating the nozzle guide;
FIG. 7C is a right side view illustrating the nozzle guide;
FIG. 7D is a rear view illustrating the nozzle guide.

DESCRIPTION OF EMBODIMENTS (1) General Configuration of Fuel Supply Apparatus FS FIG. 1 is a perspective view illustrating a filler port of a motor vehicle that is equipped with a fuel supply apparatus FS according to an embodiment. FIG. 1 illustrates the fuel supply apparatus FS that is configured to form a fuel passage for introducing a supplied fuel to a fuel tank (not shown) provided inside of the motor vehicle, and members placed in a neighborhood of the fuel supply apparatus FS. A fuel lid FL is held in an openable and closable manner on the vehicle body of the motor vehicle. The fuel lid FL has a lid main body FLa formed in a shape along the outer panel of the vehicle body. The lid main body FLa is supported in an openable and closable manner on the outer panel of the vehicle body via a hinge FLb. The space accessible by opening the fuel lid FL serves as a fuel filler chamber FR. An open-close device 10 for fuel tank mounted on a base plate BP is placed in this fuel filler chamber FR. The open-close device 10 for fuel tank is a mechanism configured to introduce the fuel through the fuel supply apparatus FS to a fuel tank without using a fuel cap. More specifically, the open-close device 10 for fuel tank is a mechanism configured to open and close the fuel passage with an external force from a fueling nozzle after opening the fuel lid FL.

FIG. 2 is a perspective view illustrating insertion of a fueling nozzle NZ to supply the fuel to the fuel supply apparatus FS. FIG. 2 illustrates the state that a leading end NZa of the fueling nozzle NZ is inserted into the open-close device 10 for fuel tank to supply the fuel to the fuel supply apparatus FS. According to this embodiment, the fuel lid FL is arranged to be opened leftward when the fuel filler chamber FR is viewed from the front side. The fueling nozzle NZ inserted into the open-close device 10 for fuel tank is rotatable counterclockwise about an axis OL1 from the fueling nozzle NZ to the open-close device 10 for fuel tank. Clockwise rotation of the fueling nozzle NZ is, however, limited since the fuel lid FL interferes with the fueling nozzle NZ. According to another embodiment, the positional relationship between the fuel lid FL and the fueling nozzle NZ inserted into the open-close device 10 for fuel tank may be modified in various ways.

FIG. 3 is a schematic diagram illustrating the positional relationship of the fuel supply apparatus FS to a fuel tank FT provided inside of the motor vehicle. The fuel supply apparatus FS includes a filler neck 100, a filler tube 40, a breather pipe 50, a flow control valve 60 and a check valve 30. The filler neck 100 is connected connected with the fuel tank FT by the filler tube 40 and the breather pipe 50. The filler tube 40 is connected with the fuel tank FT via the check valve 30. The breather pipe 50 is connected with the fuel tank FT via the flow control valve 60. The breather pipe 50 is located above the filler tube 40 in the vertical direction, so that the supplied fuel passes through the filler tube 40 and does not flow in the breather pipe 50. The fuel vapor generated by vaporization in the fuel tank FT is circulated from the fuel tank FT through the breather pipe 50 to the fuel passage formed in the filler neck 100.

(2) Detailed Configuration of Filler Neck 100

Figure 4A:
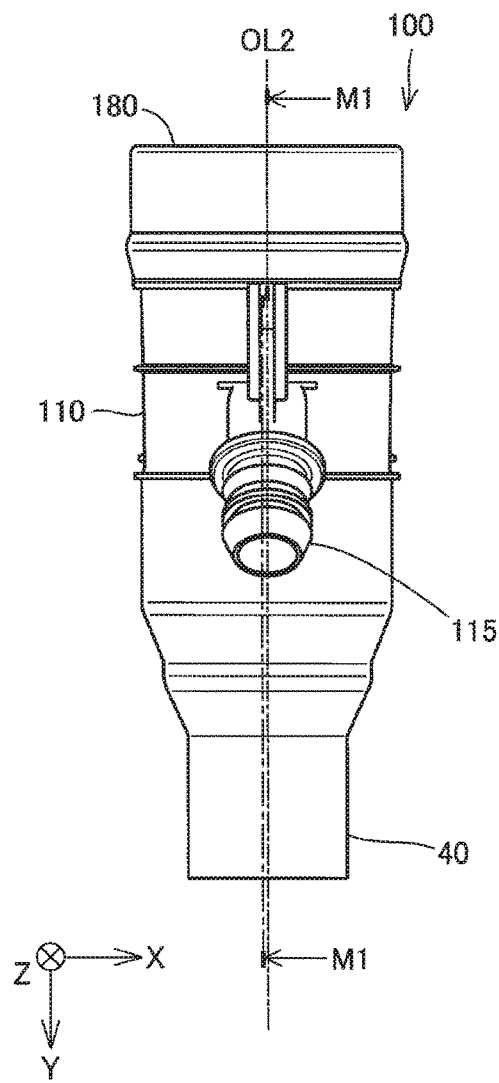
FIG. 4A is an appearance diagram illustrating a filler neck connecting with a filler tube.
Figure 4B:
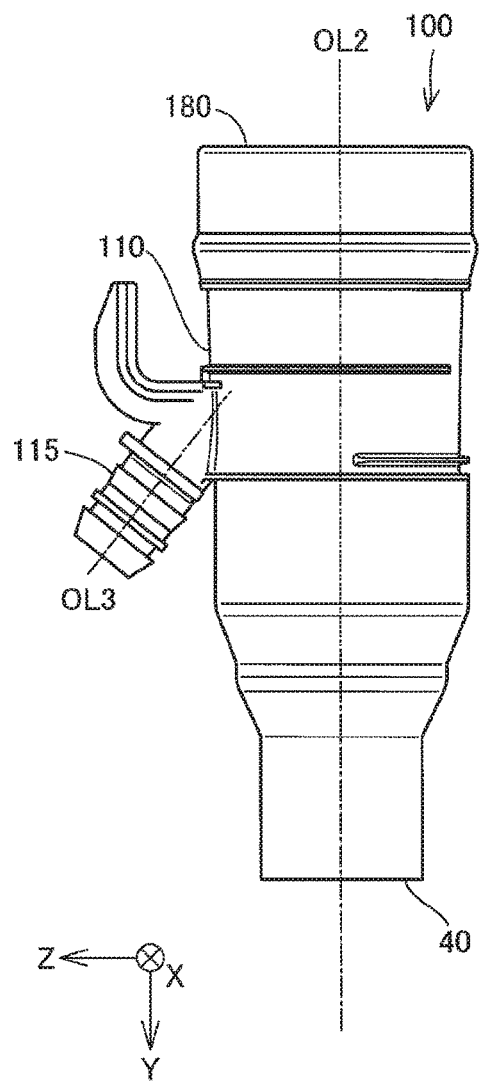
FIG. 4B is an appearance diagram illustrating the filler neck connecting with the filler tube.

FIGS. 4A and 4B are appearance diagrams illustrating the filler neck 100 connecting with the filler tube 40. More specifically, FIG. 4A is a front view illustrating the filler neck 100 connecting with the filler tube 40, and FIG. 4B is a right side view illustrating the filler neck 100 connecting with the filler tube 40. The filler neck 100 includes a filler neck body 110, a mouthpiece 180 that is provided to cover an upstream side of the filler neck body 110 and a nozzle guide 150 (not illustrated in FIGS. 4A and 4B) placed inside of the filler neck body 110. In the description of the embodiment, a fuel supply side (upper side in FIGS. 4A and 4B) of the filler neck 100 is called upstream side, and an opposite side of the filler neck 100 connecting with the filler tube 40 (lower side in FIGS. 4A and 4B) is called downstream side.

Figure 3:
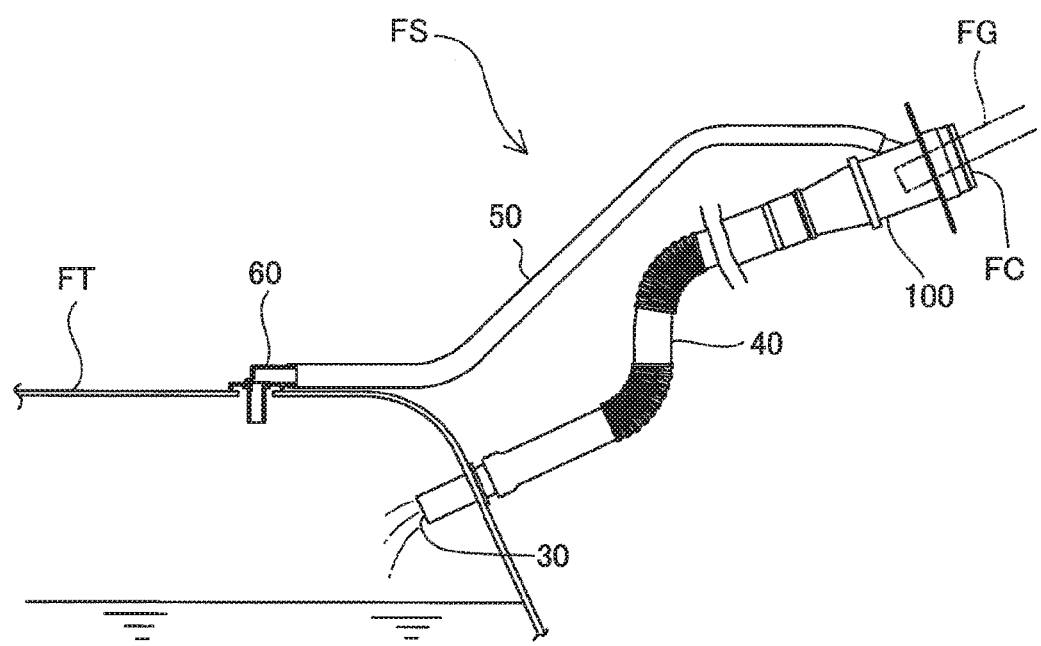
FIG. 3 is a schematic diagram illustrating the positional relationship of the fuel supply apparatus to a fuel tank provided inside of the motor vehicle.

As shown in FIGS. 4A and 4B, the filler neck body 110 is formed in a cylindrical shape connecting the upstream side with the downstream side. The filler neck body 110 has a fuel passage which the supplied fuel passes through. The details of the fuel passage and the nozzle guide 150 will be described later. As shown in FIG. 4B, the filler neck body 110 includes a breather port 115 that branches off from upstream to downstream. The breather port 115 is connected with the breather pipe 50 (shown in FIG. 3) to form part of a route that introduces the fuel vapor circulated through the breather pipe 50 to the fuel passage. The route which the fuel vapor passes through is formed about an axis OL3 inside of the breather port 115. The filler neck body 110 is made of a resin material. The mouthpiece 180 is a member provided to cover a circular opening on the upstream side of the filler neck body 110. The mouthpiece 180 is made of a metal. In the description of the embodiment, a direction from upstream toward downstream in which the fuel supplied to the filler neck 100 passes through the fuel passage is defined as +Y-axis direction. A direction that is parallel to a plane perpendicular to an axis OL2 passing through the center of the fuel passage and intersects with both the axis OL2 and the axis OL3 is defined as +Z-axis direction. An axis perpendicular to both the Y axis and the Z axis is defined as X axis.

Figure 5:
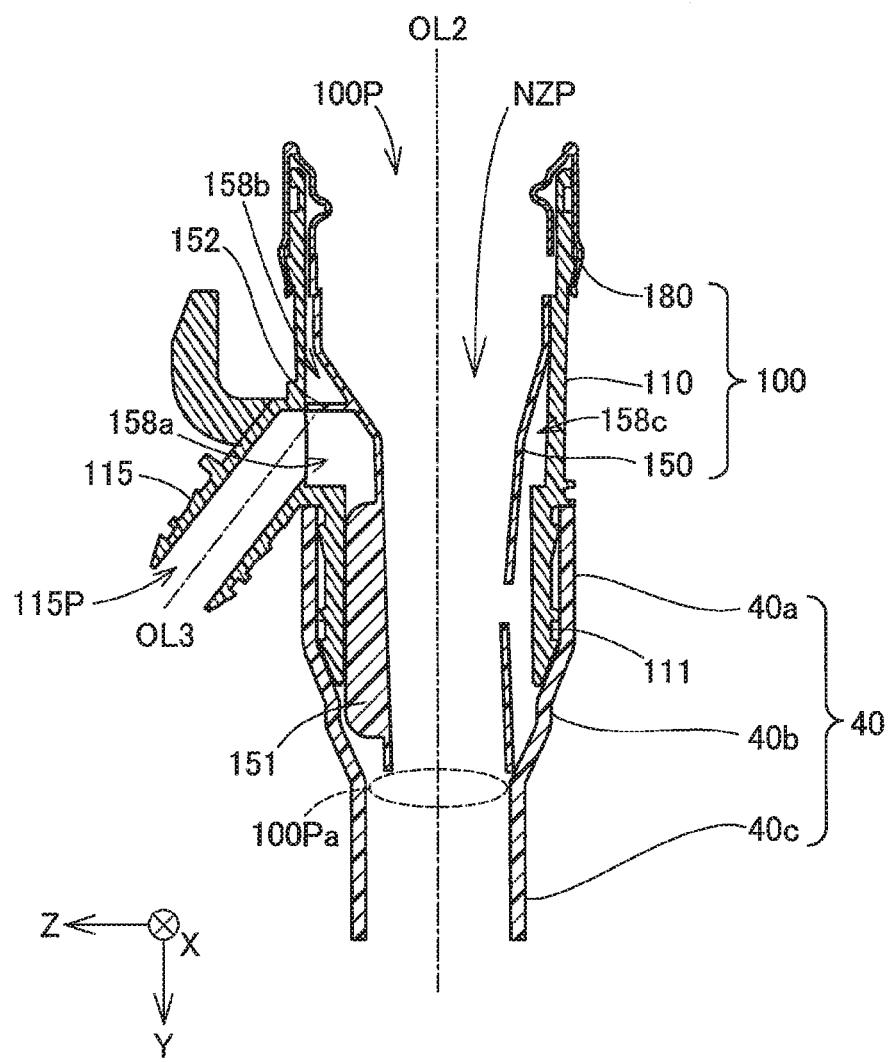
FIG. 5 is a sectional view taken along a line M1-M1 in FIG. 4A.
Figure 6:
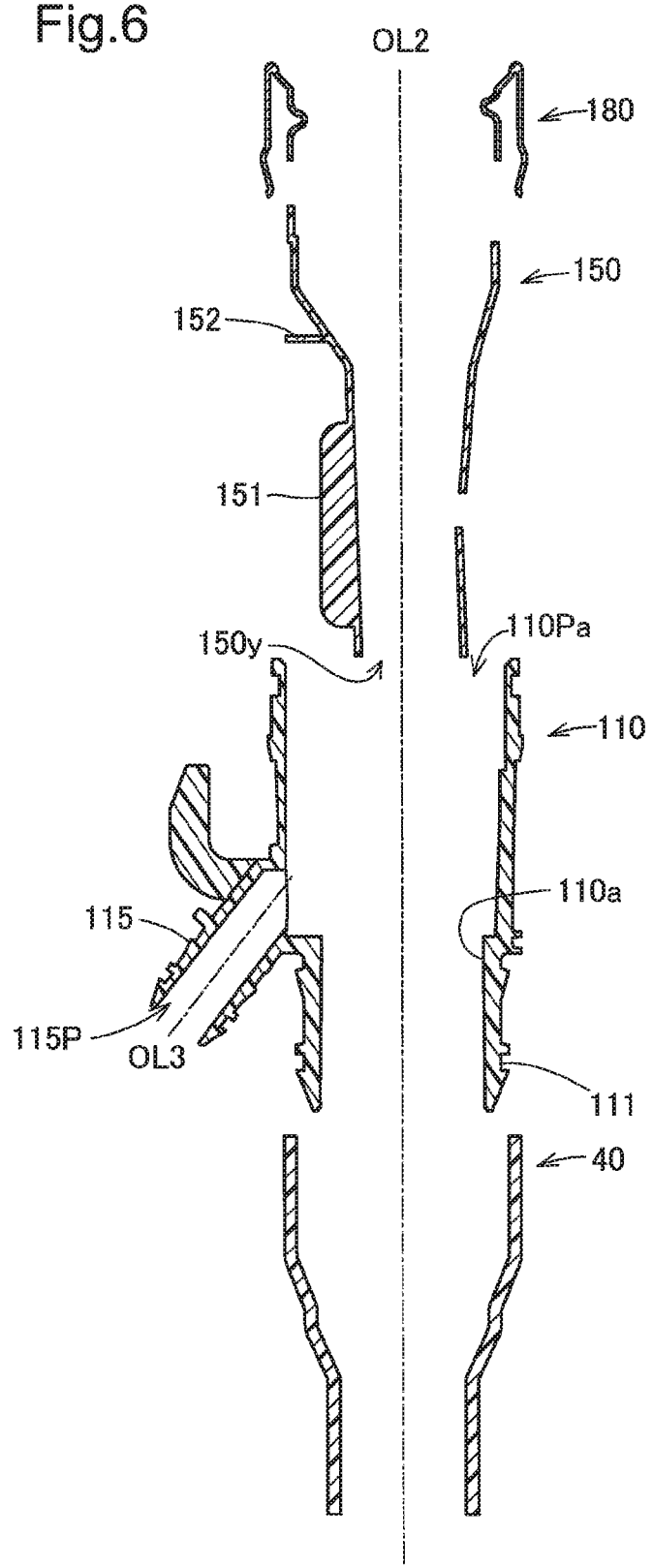
FIG. 6 is an exploded sectional view illustrating the filler tube and the filler neck.

FIG. 5 is a sectional view taken along a line M1-M1 in FIG. 4A. FIG. 6 is an exploded sectional view illustrating the filler tube 40 and the filler neck 100. The sectional view of FIG. 5 illustrates the filler neck 100 connecting with the filler tube 40. The sectional view of FIG. 6 illustrates disassembly of the respective components in the sectional view of FIG. 5. The filler neck 100 includes the filler neck body 110, the mouthpiece 180 that is fit in an opening 110Pa on the upstream side of the filler neck body 110, and the nozzle guide 150 that is placed inside of the filler neck body 110. The filler neck body 110 has an inner circumferential surface 110a provided to internally form a fuel passage 100P and is formed in a cylindrical shape to have the sectional area reduced toward downstream. The filler neck body 110 has a corrugated portion 111 that is formed in a corrugated shape on an outer circumferential surface on the downstream side to allow the filler tube 40 to be press-fit on. The breather port 115 of the filler neck body 110 forms an introduction path 115P arranged to introduce the fuel vapor circulated from the fuel tank FT through the breather pipe 50 to the fuel passage 100P. The filler neck 100 is manufactured by placing the nozzle guide 150 inside of the filler neck body 110 and subsequently fitting the mouthpiece 180 at the opening 110Pa of the filler neck body 110.

The nozzle guide 150 is a cylindrical member that is fit and placed in the filler neck body 110. The nozzle guide 150 has an inner circumferential surface that forms a nozzle guide path NZP as part of the fuel passage 100P. The inner circumferential surface of the nozzle guide 150 is formed to have the sectional area reduced from upstream to downstream. The nozzle guide path NZP having the sectional area reduced from upstream to downstream serves to introduce the leading end NZa of the fueling nozzle NZ inserted into the fuel passage 100P toward downstream in the fuel passage 100P. The nozzle guide 150 has a vapor guide portion 152 configured to introduce the fuel vapor that is introduced through the introduction path 115P to the filler neck body 110, to downstream. The detailed configuration of the vapor guide portion 152 will be described later.

As shown in FIG. 5, the vapor guide portion 152 and the inner circumferential surface 110a of the filler neck body 110 define a space 158a that connects the introduction path 115P with the fuel passage 100P. The vapor guide portion 152 and the inner circumferential surface 110a of the filler neck body 110 also define a space 158b that is located upstream of the space 158a and does not directly communicate with the introduction path 115P. In a location symmetrical to the space 158a with respect to the axis OL2 (location on the −Z-axis direction side), the outer circumferential surface of the nozzle guide 150 and the inner circumferential surface 110a of the filler neck body 110 define a space 158c. The space 158a, the space 158b and the space 158c communicate with one another by a labyrinthine structure defined by the outer circumferential surface of the nozzle guide 150 and the inner circumferential surface 110a of the filler neck body 110.

As shown in FIG. 5, the nozzle guide 150 has a reinforcement rib 151 formed along an outer circumferential surface between the vapor guide portion 152 and a lower end 150y of the nozzle guide 150 to increase the strength of the nozzle guide 150. The reinforcement rib 151 is formed parallel to the axis OL2 and is protruded radially outward about the axis OL2 from the outer circumferential surface of the nozzle guide 150. According to this embodiment, the lower end 150y of the nozzle guide 150 placed inside of the filler neck body 110 and a downstream lower end of the reinforcement rib 151 formed on the outer circumferential surface of the nozzle guide 150 are located closer to the fuel tank FT than a downstream lower end of the filler neck body 110. In other words, the lower end of the nozzle guide 150 and the lower end of the reinforcement rib 151 are extended along the axial direction to be located downstream of the lower end of the filler neck body 110. As shown in FIG. 5, the amount of radially outward protrusion at the lower end of the reinforcement rib 151 is gradually decreased toward downstream, so that the reinforcement rib 151 is chamfered in an arc shape (R shape) in a section along the axial direction. The fuel vapor circulated through the introduction path 115P to the filler neck body 110 joins with the fuel supplied from the fueling nozzle NZ in the vicinity of a junction 100Pa below the lower end of the nozzle guide 150.

The filler tube 40 includes a press-fit portion 40a that is press fit on the corrugated portion 111, a middle portion 40b that is connected on its downstream side with the press-fit portion 40a, and a flow-in portion 40c that is connected on its downstream side with the middle portion 40b. The middle portion 40b is tapered toward a downstream end of the corrugated portion 111 to have an inner diameter that is approximately equal to the inner diameter of the corrugated portion 111 of the filler neck body 110. The flow-in portion 40c forms the fuel passage 100P from the lower end 150y to the fuel tank FT. The fuel passage 100P has a diameter that is equal to the smallest diameter of the middle portion 40b at the lower end 150y of the nozzle guide 150. In other words, the middle portion 40b is extended to downstream of the corrugated portion 111 and has the larger diameter than the flow-in portion 40c. The flow-in portion 40c has the inner circumference eccentrically arranged to be smoothly continuous, at the lower end 150y of the nozzle guide 150, with the inner circumference of the nozzle guide 150 that is located on the opposite side (−Z-axis direction side) opposite to the breather port 115 and located below the breather port 115 in the vertical direction in the state that the fuel supply apparatus FS is mounted in the vehicle. A seal ring (not shown) is placed between the corrugated portion 111 of the filler neck body 110 and the filler tube 40 to prevent the liquid fuel and the fuel vapor from flowing out.

Figure 8:
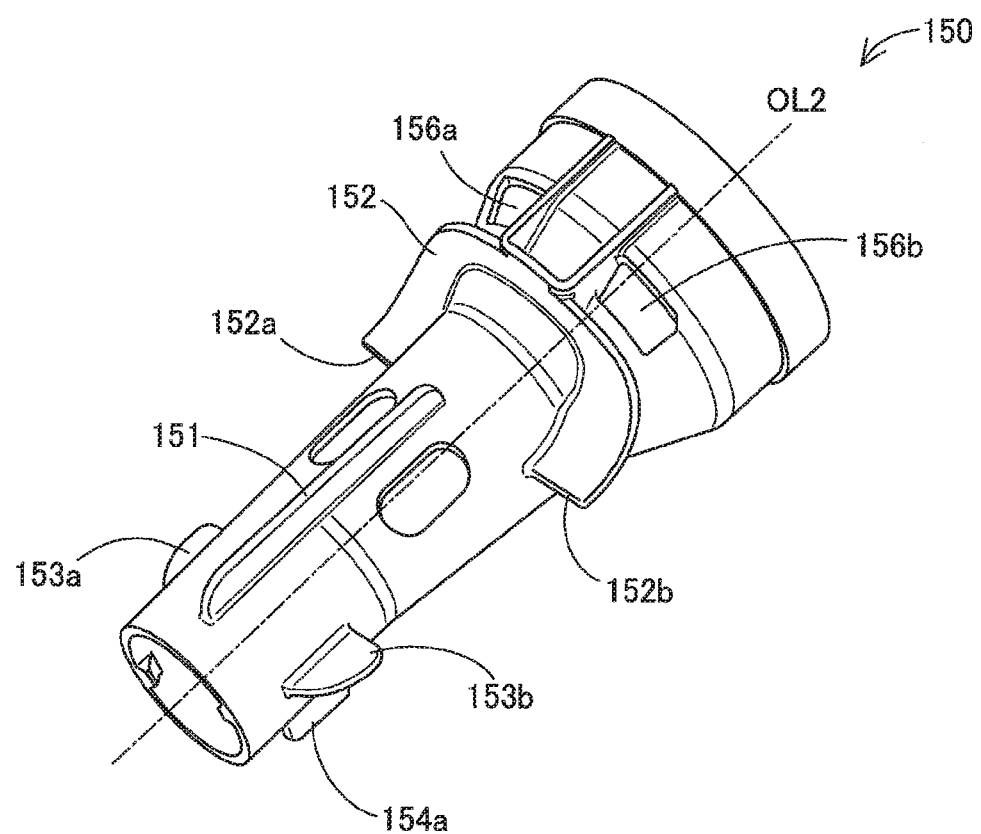
FIG. 8 is a perspective view illustrating the nozzle guide.
Figure 9:
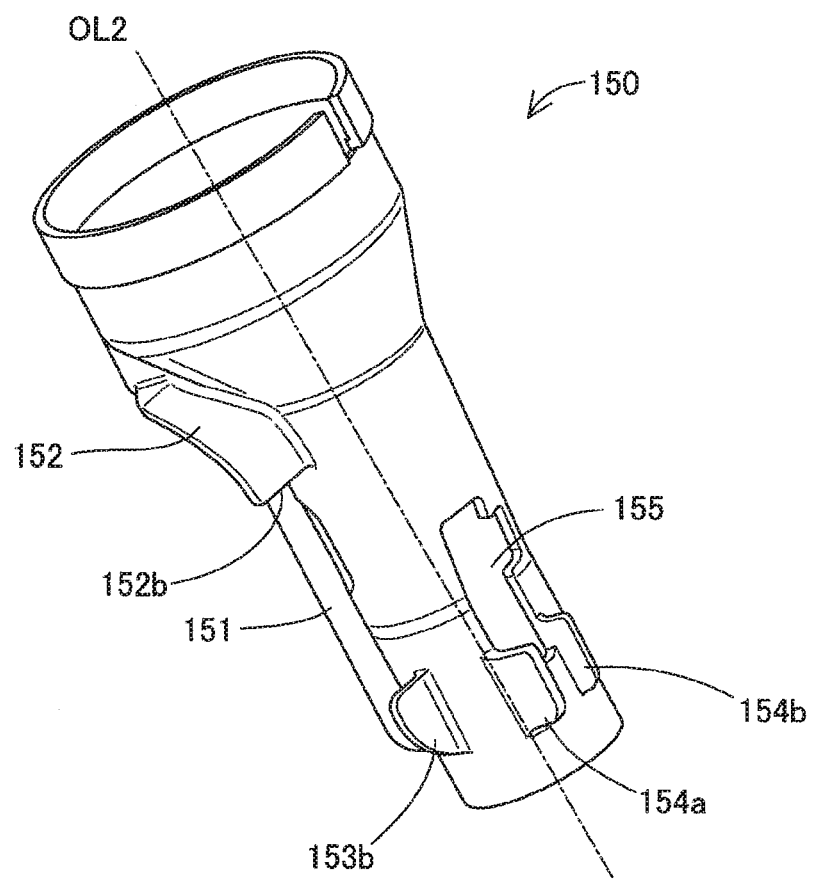
FIG. 9 is a perspective view illustrating the nozzle guide.

FIGS. 7A to 7D are four side views of the nozzle guide 150. FIG. 7A is a left side view illustrating the nozzle guide 150, FIG. 7B is a front view illustrating the nozzle guide 150, FIG. 7C is a right side view illustrating the nozzle guide 150, and FIG. 7D is a rear view illustrating the nozzle guide 150. FIGS. 8 and 9 are perspective views illustrating the nozzle guide 150. The front view and the right side view of the nozzle guide 150 shown in FIGS. 7B and 7C respectively correspond to the front view and the right side view of the filler neck 100 shown in FIGS. 4A and 4B.

As shown in FIGS. 7A, 7B and 7C, the vapor guide portion 152 is formed in a configuration that is bent along the cylindrical outer circumferential surface of the nozzle guide 150 to be directed to downstream on the inner side closer to the axis OL2 as the center. The vapor guide portion 152 is formed in a configuration that the fuel vapor circulated to the introduction path 115P does not directly flow into the space 158c (shown in FIG. 5) on the opposite side about the axis OL2. The nozzle guide 150 has a first communication hole 156a and a second communication hole 156b (hereinafter may be collectively called "communication holes 156a and 156b") upstream of the vapor guide portion 152. The communication holes 156a and 156b are arranged to make the fuel passage 100P communicate with the spaces 158a, 158b and 158c shown in FIG. 5. The communication holes 156a and 156b are formed upstream of the vapor guide portion 152, so that the fuel vapor passing through the introducing path 115P is introduced to downstream by the vapor guide portion 152 and does not cause the fuel vapor to directly flow into the fuel passage 100P upstream of the filler neck 100 through the communication holes 156a and 156b. In other words, the fuel vapor is flowed along the circumferential direction on the outer circumference of the nozzle guide 150 to the communication holes 156a and 156b.

As shown in FIGS. 7C, 7D and 9, the nozzle guide 150 has a sensor-corresponding hole 155 formed on the cylindrical outer circumferential surface of the nozzle guide 150 to make the fuel passage 100P communicate with the space 158c (shown in FIG. 5). According to this embodiment, the sensor-corresponding hole 155 is an opening in the combined shape of two rectangles as shown in FIG. 7D. The sensor-corresponding hole 155 has an enlarged hole portion 155a formed along the axial direction to be open wider than the remaining portion in the circumferential direction about the axis OL2. The sensor-corresponding hole 155 is provided on the opposite side to the breather port 115 about the axis OL2 and is located below the breather port 115 in the state that the fuel supply apparatus FS is mounted in the motor vehicle. The broken line of FIG. 7D showing the enlarged hole portion 155a is a phantom line for explaining the enlarged hole portion 155a and does not indicate the actual configuration of the nozzle guide 150. According to another embodiment, the sensor-corresponding hole 155 may be formed in a different configuration.

As shown in FIGS. 7D and 9, the nozzle guide 150 has a first hole rib 154a and a second hole rib 154b that are formed along a downstream portion of the sensor-corresponding hole 155 to be protruded radially outward from the cylindrical outer circumferential surface of the nozzle guide 150. The first hole rib 154a and the second hole rib 154b are formed parallel to the axis OL2. The first hole rib 154a and the second hole rib 154b are formed at the corresponding positions along the axis OL2 to have the same length along the axis OL2 and the same height of radially outward protrusion from the outer circumferential surface of the nozzle guide 150. In the description hereafter, the first hole rib 154a and the second hole rib 154b may be collectively called "hole ribs 154a and 154b".

As shown in FIGS. 7B and 8, the nozzle guide 150 has a first rectifier rib 153a and a second rectifier rib 153b that are protruded radially outward from the cylindrical outer circumferential surface of the nozzle guide 150 and are formed away from the vapor guide portion 152. As shown in FIG. 7A, the first rectifier rib 153a is formed along the axis OL2 to be located downstream of a first downstream end 152a that is one end on the downstream side of the vapor guide portion 152. Similarly as shown in FIG. 7C, the second rectifier rib 153b is formed along the axis OL2 to be located downstream of a second downstream end 152b that is the other end on the downstream side of the vapor guide portion 152. The first rectifier rib 153a and the second rectifier rib 153b are formed at different positions on the nozzle guide 150 but have identical configurations to be protruded from the cylindrical outer circumferential surface of the nozzle guide 150. The first rectifier rib 153a is formed parallel to the axis OL2. The amount of radially outward protrusion of the first rectifier rib 153a is maximum at its upstream end and is gradually reduced to downward. In the description hereafter, the first rectifier rib 153a and the second rectifier rib 153b may be collectively called "rectifier ribs 153a and 153b".

(3) Functions and Advantageous Effects of Vapor Guide Portion 152 and Rectifier Ribs 153a and 153b The configuration of the above embodiment has the following advantageous effects.

Figure 10:
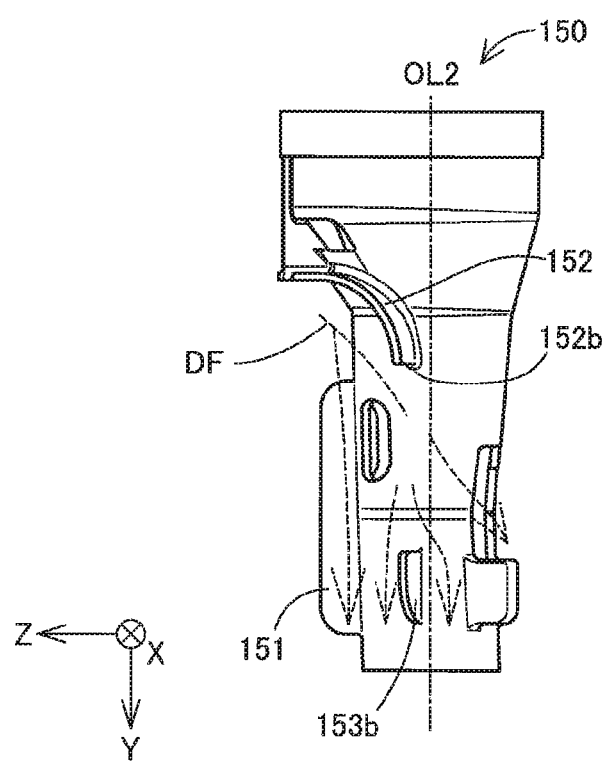
FIG. 10 is a conceptual diagram illustrating the flow of fuel vapor circulated in the fuel supply apparatus.

FIG. 10 is a conceptual diagram illustrating the flow of the fuel vapor circulated in the fuel supply apparatus FS. FIG. 10 shows arrows DF indicating the flow of the fuel vapor in the right side view of the nozzle guide 150 shown in FIG. 7C. As shown in FIG. 10, the flow of the fuel vapor introduced to downstream by the vapor guide portion 152 is divided by the second rectifier rib 153b to be rectified and flowed to downstream without causing turbulence in the space 158a.

As described above, in the fuel supply apparatus FS of the embodiment, the vapor guide portion 152 of the nozzle guide 150 serves to introduce the fuel vapor that is circulated from the fuel tank FT through the introduction path 115P to the filler neck 100, to downstream in the fuel passage 100P. The rectifier ribs 153a and 153b serve to rectify the fuel vapor that is introduced to downstream by the vapor guide portion 152 without causing turbulence in the middle and introduce the rectified fuel vapor to downstream in the fuel passage 100P. The rectified fuel vapor joins with the fuel supplied from the fueling nozzle NZ at the junction 100Pa of the fuel passage 100P. The flow of the fuel vapor introduced to downstream by the vapor guide portion 152 is spread upward on the circumferential direction in the space 158a defined by the vapor guide portion 152 and the rectifier ribs 153a and 153b and is divided by the rectifier ribs 153a and 153b. In the fuel supply apparatus FS of the embodiment, the rectifier ribs 153a and 153b serve to divide the flow of the fuel vapor circulated inside of the fuel supply apparatus FS. This enables the fuel vapor to be smoothly flowed inside of the fuel supply apparatus FS with suppressing turbulence from being generated in the fuel vapor in the middle of circulation. This accordingly suppresses an increase in internal pressure of the fuel tank FT and enables the fuel supplied from the fueling nozzle NZ to be smoothly flowed into the fuel tank FT. Rectifying the fuel vapor by the rectifier ribs 153a and 153b enables the fuel vapor circulated inside of the fuel supply apparatus FS to be smoothly joined with the supplied fuel. This improves the fueling performance of the fuel supplied from the fueling nozzle NZ without causing turbulence when the fuel vapor is joined with the fuel. In the fuel supply apparatus FS of the embodiment, the fuel vapor introduced to downstream by the vapor guide portion 152 is diffused in the circumferential direction in the space 158. This suppresses accumulation of the fuel vapor and suppresses turbulence of the fuel vapor.

In the fuel supply apparatus FS of the embodiment, the vapor guide portion 152 suppresses the fuel vapor flowed through the introduction path 115P into the space 158a from flowing to upstream. The communication holes 156a and 156b communicating with the fuel passage 100P are formed on the nozzle guide 150 to be located upstream of the fuel guide portion 152. The vapor guide portion 152 accordingly does not directly introduce the fuel vapor that is flowed through the introduction path 115P into the space 158a, to the communication holes 156a and 156b and thereby suppresses the splash of the fuel from leaking out. Additionally, in the course of supplying the fuel from the fueling nozzle NZ to the fuel supply apparatus FS, this configuration causes the adequate amount of the air to be released out of the fuel supply apparatus FS.

In the fuel supply apparatus FS of the embodiment, the rectifier ribs 153a and 153b are formed integrally with the outer circumferential surface of the nozzle guide 150 on which the vapor guide portion 152 is formed. This configuration enables the vapor guide portion 152 and the rectifier ribs 153a and 153b to be readily produced at the designed positions. This configuration also reduces the total number of components placed inside of the filler neck body 110 and facilitates manufacture of the fuel supply apparatus FS.

In the fuel supply apparatus FS of the embodiment, the rectifier ribs 153a and 153b are formed parallel to the axis OL2 of the filler neck 100 and the nozzle guide 150. This configuration enables the fuel vapor to be more smoothly introduced to the fuel tank FT, compared with a configuration that the rectifier ribs 153a and 153b are not formed parallel to the axis OL2.

In the fuel supply apparatus FS of the embodiment, the vapor guide portion 152 is formed in the configuration that is bent to be directed to downstream. This configuration introduces the fuel vapor to downstream with suppressing turbulence from being generated in the fuel vapor joined with the supplied fuel.

(4) Functions and Advantageous Effects of Enlarged Hole Portion 155a of Sensor-Corresponding Hole 155

The configuration of the above embodiment has the following advantageous effects.

Figure 1:
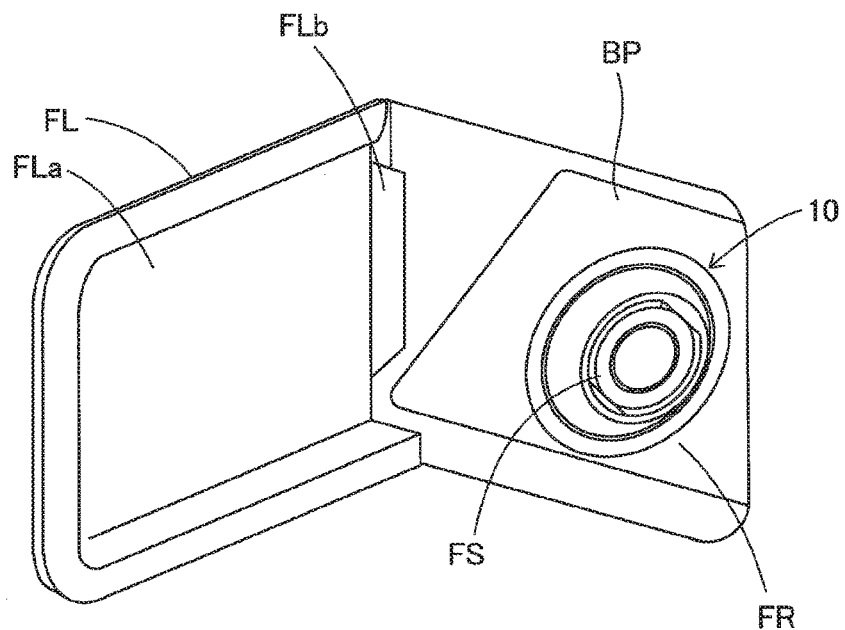
FIG. 1 is a perspective view illustrating a filler port of a motor vehicle equipped with a fuel supply apparatus according to an embodiment.
Figure 2:
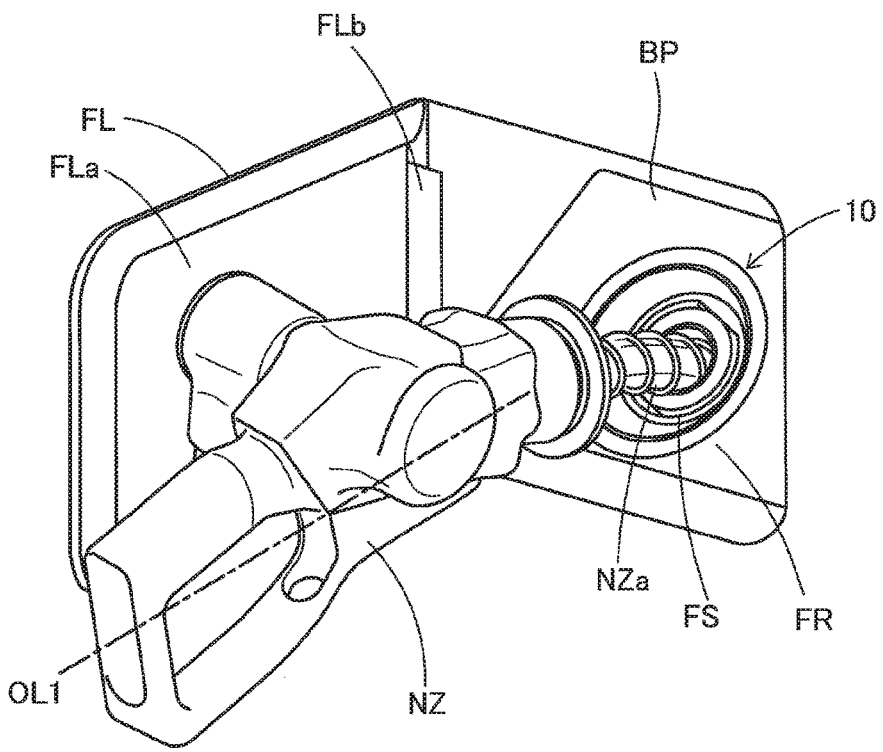
FIG. 2 is a perspective view illustrating insertion of a fueling nozzle to supply a fuel to the fuel supply apparatus.

According to the embodiment, as shown in FIG. 2, the fuel lid FL enables the fueling nozzle NZ inserted into the fuel supply apparatus FS to be rotated counterclockwise about the axis OL1. As the fueling nozzle NZ is rotated, the position of a gas sensor placed on the leading end NZa of the fueling nozzle NZ to detect the fuel is also rotated about the axis of the leading end NZa of the fueling nozzle NZ. In the fuel supply apparatus FS of the embodiment, the sensor-corresponding hole 155 is formed at a corresponding location of the nozzle guide 150 corresponding to the gas sensor for the fueling nozzle NZ inserted into the fuel supply apparatus FS. The sensor-corresponding hole 155 has the enlarged hole portion 155a that is open wider in the circumferential direction about the axis OL2 of the nozzle guide 150, in order to respond to a change in position of the gas sensor for the fueling nozzle NZ accompanied with rotation of the fueling nozzle NZ. The sensor-corresponding hole 155 is not unnecessarily wide open in the circumferential direction in the remaining portion other than the enlarged hole portion 155a. In the fuel supply apparatus FS of the embodiment, even when the fuel supplied to the fuel supply apparatus FS is filled up to the filler neck 100, the sensor-corresponding hole 155 prevents containment of the fuel supplied to between the outer circumferential surface of the nozzle guide 150 and the inner circumferential surface of the filler neck body 110. This configuration controls the strength of the nozzle guide 150 having the sensor-corresponding hole 155 and enables the gas sensor for the fueling nozzle NZ to be quickly detect the liquid level of the fuel supplied to the fuel supply apparatus FS at a predetermined position. Additionally the sensor-corresponding hole 155 has the enlarged hole portion 155*a* that is open wider in the circumferential direction. Even in the case of rotation of the fueling nozzle NZ inserted in the fuel supply apparatus FS, this configuration enables the gas sensor for the fueling nozzle NZ to quickly detect the liquid level of the fuel supplied to the fuel supply apparatus FS at the predetermined position. The sensor-corresponding hole 155 of the nozzle guide 150 is not unnecessarily wide open in the circumferential direction in the remaining portion other than the enlarged hole portion 155*a*. This configuration enables the nozzle guide 150 to readily guide the fueling nozzle, provides the nozzle guide 150 with required strength and suppresses the fuel vapor from flowing out and the splash of the fuel from leaking out.

In the fuel supply apparatus FS of the embodiment, the sensor-corresponding hole 155 is formed on the opposite side to the breather port 115 about the axis OL2 of the nozzle guide 150 to be located below the breather port 115 in the state that the fuel supply apparatus FS is mounted in the motor vehicle. Accordingly the fuel supply apparatus FS of the embodiment enables the gas sensor for the fueling nozzle NZ to detect the liquid level of the supplied fuel at the lower position and thereby more effectively prevents overflow of the fuel supplied to the fuel supply apparatus FS.

In the fuel supply apparatus FS of the embodiment, the first hole rib 154*a* and the second hole rib 154*b* are formed along the downstream portion of the sensor-corresponding hole 155. In the fuel supply apparatus FS of the embodiment, the first hole rib 154*a* and the second hole rib 154*b* introduce the supplied fuel to the sensor-corresponding hole 155. This enables the gas sensor for the fueling nozzle NZ to more quickly detect the liquid level of the supplied fuel and more effectively prevents overflow of the fuel supplied to the fuel supply apparatus FS.

B. Modifications

The invention is not limited to the above embodiment, but a diversity of variations and modifications may be made to the embodiment without departing from the scope of the invention. Some examples of possible modification are described below.

The configuration, the positions and the number of the rectifier ribs 153*a* and 153*b* are not limited to the above embodiment but may be modified in various ways. For example, only one of the first rectifier rib 153*a* and the second rectifier rib 153*b* of the above embodiment may be provided as the rectifier rib. According to another modification, another rectifier rib may be provided, in addition to the first rectifier rib 153*a* and the second rectifier rib 153*b*. According to the above embodiment, the rectifier ribs 153*a* and 153*b* are formed to be protruded radially outward from the outer circumferential surface of the nozzle guide 150. According to a modification, the rectifier ribs 153*a* and 153*b* may be formed to be protruded radially inward from the inner circumferential surface of the filler neck body 110. According to another modification, the rectifier ribs 153*a* and 153*b* may be formed on a separate component placed between the filler neck body 110 and the nozzle guide 150. The first rectifier rib 153*a* and the second rectifier rib 153*b* are formed as linear protrusions parallel to the axis OL2 according to the above embodiment, but may be not parallel to the axis OL2 or may be bent in the middle. The amount of protrusion of the rectifier ribs 153*a* and 153*b* from the outer circumferential surface of the nozzle guide 150 is reduced from upstream to downstream according to the embodiment. This is, however, not restrictive and may be modified in any of various ways. For example, the amount of protrusion of the rectifier ribs 153*a* and 153*b* may be increased from upstream to downstream or may be constant. The sectional area of the rectifier ribs 153*a* and 153*b* is reduced from upstream to downstream according to the embodiment. This is, however, not restrictive and may be modified in any of various ways. For example, the sectional area of the rectifier ribs 153*a* and 153*b* may be increased from upstream to downstream or may be constant.

The configuration of the vapor guide portion 152 is not limited to the configuration of the above embodiment but may be modified in any of various ways. According to the above embodiment, the vapor guide portion 152 is formed in the configuration that is bent to be directed to downstream on the inner side closer to the axis OL2 as the center. According to a modification, the vapor guide portion 152 may be formed in a configuration that a plane perpendicular to the axis OL2 is combined to be orthogonal to a plane parallel to the axis OL2. According to another modification, the vapor guide portion 152 may be formed in a configuration of only a plane perpendicular to the axis OL2.

Figure 11:
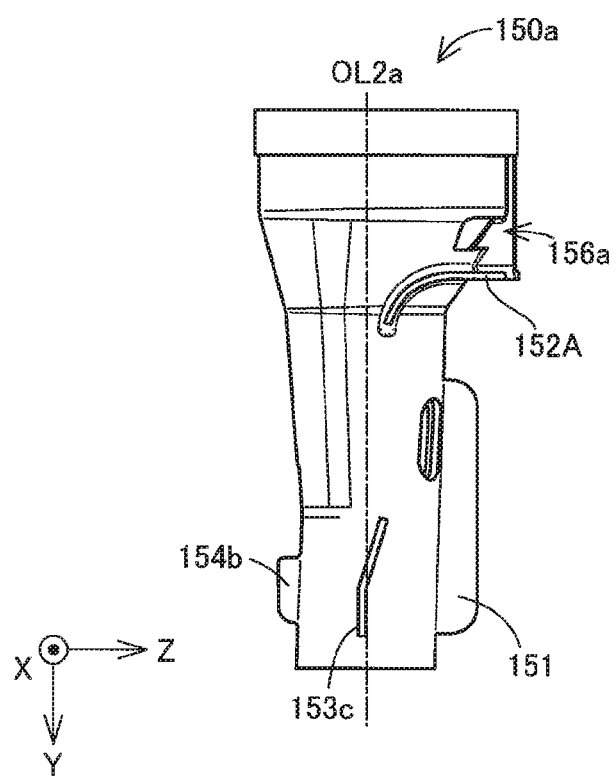
FIG. 11 is a left side view illustrating a nozzle guide according to a modification.

FIG. 11 is a left side view illustrating a nozzle guide 150*a* according to a modification. The nozzle guide 150*a* of the modification shown in FIG. 11 has a vapor guide portion 152A and a third rectifier rib 153*c* that is formed on the outer circumferential surface of the nozzle guide 150*a* in a different configuration from that of the first rectifier rib 153*a* of the above embodiment. The positional relationship between the vapor guide portion and the rectifier rib may be modified in any of various ways, like the positional relationship between the vapor guide portion 152A and the third rectifier rib 153*c* shown in FIG. 11.

Figure 12:
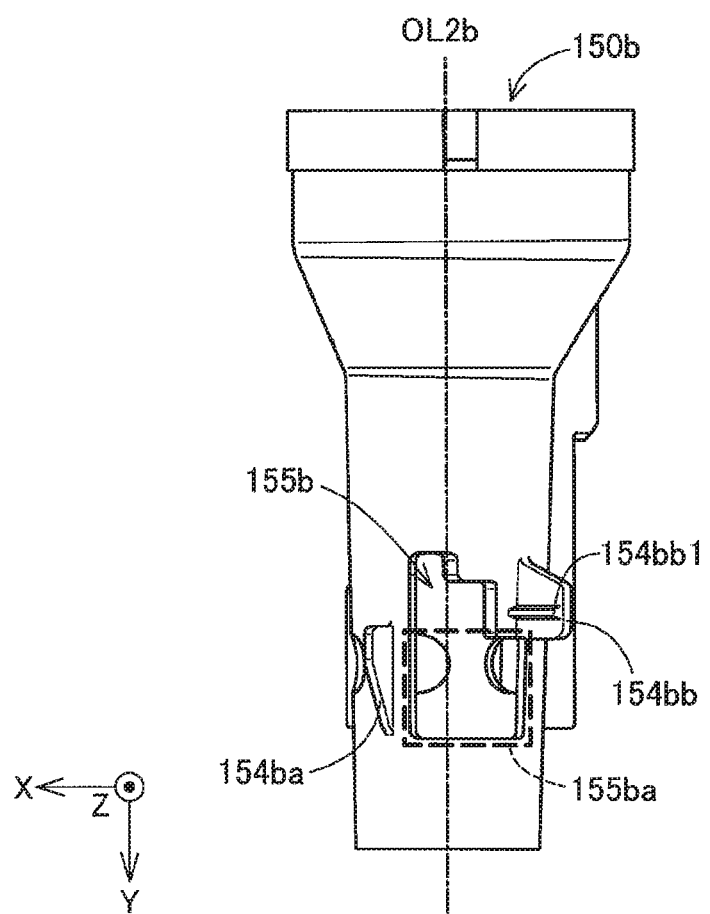
FIG. 12 is a rear view illustrating a nozzle guide according to another modification.
Figure 13:
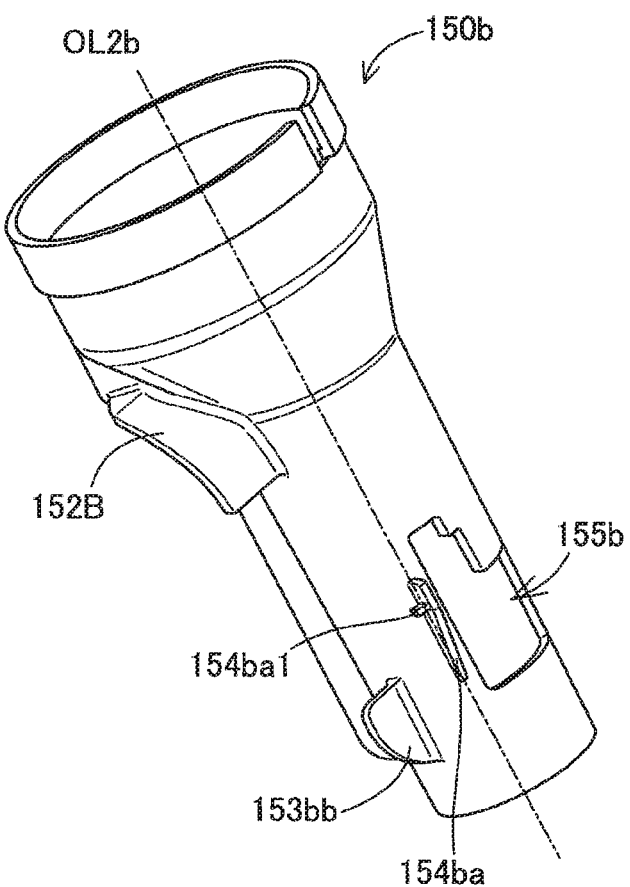
FIG. 13 is a perspective view illustrating the nozzle guide of the modification.

FIG. 12 is a rear view illustrating a nozzle guide 150*b* according to another modification. FIG. 13 is a perspective view illustrating the nozzle guide 150*b* of the modification. The nozzle guide 150*b* of the modification differs from the nozzle guide 150 of the above embodiment by the configuration of a sensor-corresponding hole 155*b* formed in the nozzle guide 150*b* and first and second hole ribs 154*ba* and 154*bb* formed in the vicinity of the sensor-corresponding hole 155*b* on the outer circumferential surface of the nozzle guide 150*b*. As shown by the broken line in FIG. 12, the sensor-corresponding hole 155*b* has an enlarged hole portion 155*ba* that is provided on its downstream portion to be open wider than the remaining portion in the circumferential direction about an axis OL2*b* of the nozzle guide 150*b*. The broken line of FIG. 12 is a phantom line and does not indicate the actual configuration of the nozzle guide 150*b*.

As shown in FIG. 12, unlike the hole ribs 154*a* and 154*b* of the above embodiment, the first hole rib 154*ba* and the second hole rib 154*bb* are provided not to adjoin to the sensor-corresponding hole 155*b*. In other words, the first hole rib 154*ba* and the second hole rib 154*bb* of the modification are adjacent to the sensor-corresponding hole 155*b* across respective portions of the cylindrical outer circumferential surface of the nozzle guide 150*b*. As shown in FIG. 12, the amount of protrusion of the second hole rib 154*bb* from the outer circumferential surface of the nozzle guide 150*b* is increased toward downstream. The position of the second hole rib 154*bb* is different from and upstream of the position of the first hole rib 154*ba* along the axis OL2*b* of the nozzle guide 150*b*. The second hole rib 154*bb* is not a linear protrusion formed along the axis OL2*b* but has an auxiliary rib 154*bb*1 provided perpendicularly to the axis OL2*b*. As shown in FIG. 13, the first hole rib 154*ba* has an auxiliary rib 154*ba*1 provided perpendicularly to the axis OL2*b*, like the second hole rib 154*bb*. As described above, the configurations of the sensor-corresponding hole and the hole ribs may be modified in any of various ways, like the sensor-corresponding hole 155b formed in the nozzle guide 150b and the hole ribs 154ba and 154bb provided in the vicinity of the sensor-corresponding hole 155b.

Figure 14:
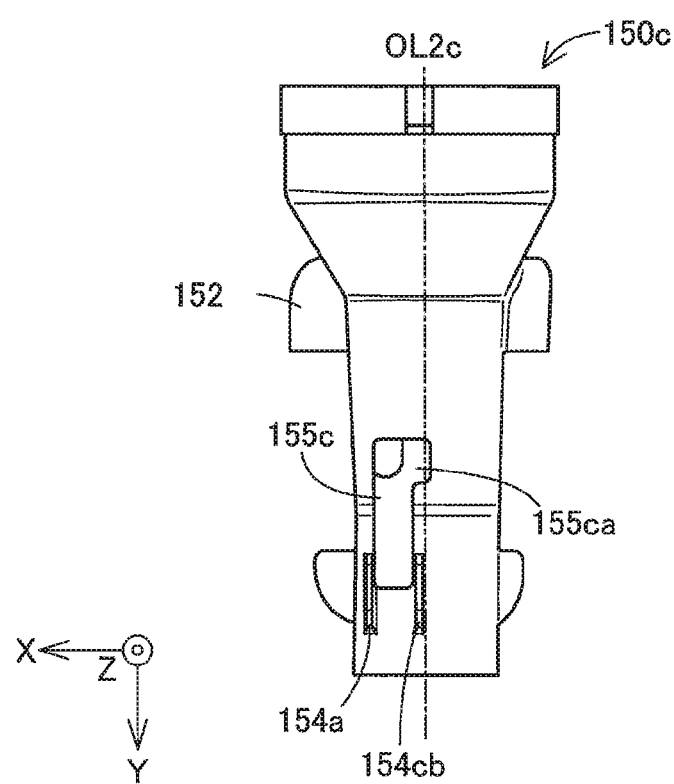
FIG. 14 is a rear view illustrating a nozzle guide according to another modification.

FIG. 14 is a rear view illustrating a nozzle guide 150c according to another modification. The nozzle guide 150c of the modification shown in FIG. 14 differs from the nozzle guide 150 of the above embodiment by only the configuration of a sensor-corresponding hole 155c. The sensor-corresponding hole 155c of the modification has an enlarged hole portion 155ca that is provided on its upstream portion to be open wider than the remaining portion in the circumferential direction about an axis OL2c of the nozzle guide 150c. As described above, the location of the enlarged hole portion in the sensor-corresponding hole may be modified in any of various ways, like the enlarged hole portion 155ca in the sensor-corresponding hole 155c.

According to the above embodiment, the location of the enlarged hole portion 155a in the sensor-corresponding hole 155 is set corresponding to the location of the fuel supply apparatus FS mounted in the motor vehicle and the location of the fuel lid FL provided to open and close the fuel filler chamber FR in which the fuel supply apparatus FS is placed. The location of the enlarged hole portion 155a may be changed in any of various ways. For example, the enlarged hole portion 155a in the sensor-corresponding hole 155 may be formed in a location corresponding to the rotatable position of the leading end NZa of the fueling nozzle NZ inserted into the fuel supply apparatus FS.

The invention is not limited to any of the embodiment, the examples and the modifications described above but may be implemented by a diversity of other configurations without departing from the scope of the invention. For example, the technical features of any of the embodiment, examples and modifications corresponding to the technical features of each of the aspects described in SUMMARY may be replaced or combined appropriately, in order to solve part or all of the problems described above. Any of the technical features may be omitted appropriately unless the technical feature is described as essential herein.

The invention claimed is:

1. A fuel supply apparatus, comprising:
a filler neck body that is configured to include a hollow fuel passage-forming portion arranged to define a fuel passage which a supplied fuel passes through, and a breather port arranged to branch off from the fuel passage-forming portion;
a nozzle guide that is placed inside of the fuel passage-forming portion and is configured to introduce a fueling nozzle for supplying the fuel in a first direction from a body opening of the filler neck body in which the fueling nozzle is inserted toward a fuel tank;
a guide portion that is configured to introduce an inflow gas flowing in from the breather port, to the fuel passage via an outer circumferential space defined by the fuel passage-forming portion and an outer circumferential surface of the nozzle guide; and
a rib that is provided between the guide portion and a lower end in the first direction of the nozzle guide and is configured to divide the inflow gas introduced through the fuel passage, wherein the guide portion and the rib are formed integrally with the nozzle guide to be away from each other on an outer circumference of the nozzle guide.

2. The fuel supply apparatus according to claim 1, wherein
the guide portion is provided to prevent the inflow gas from flowing in a second direction, which is opposite to the first direction, through the breather port, and
the nozzle guide has a hole that is provided upstream of the guide portion to make the fuel passage communicate with the outer circumferential space and is formed on a side where the guide portion is located with respect to an axis of the nozzle guide.

3. The fuel supply apparatus according to claim 2, wherein the rib is formed along the axis of the nozzle guide.

4. The fuel supply apparatus according to claim 3, wherein the guide portion is formed to be bent toward the first direction.

5. The fuel supply apparatus according to claim 1, wherein the rib is formed along an axial direction of the nozzle guide.

6. The fuel supply apparatus according to claim 1, wherein the guide portion is formed to be bent toward the first direction.

7. A fuel supply apparatus, comprising:
a hollow filler neck body that is configured to define a fuel passage which a supplied fuel passes through; and
a nozzle guide that is placed inside of the filler neck body and is configured in a tubular form to introduce a fueling nozzle for supplying the fuel in a first direction from a body opening of the filler neck body in which the fueling nozzle is inserted toward a fuel tank, wherein
the nozzle guide has an opening configured to make the fuel passage communicate with an outer circumferential space that is defined by an outer circumferential surface of the nozzle guide and an inner circumferential surface of the filler neck body,
the opening includes an enlarged opening portion that is open wider than a remaining portion along a circumferential direction, and
the enlarged opening portion is formed along an axial direction of the fuel passage.

8. The fuel supply apparatus according to claim 7, wherein
the filler neck body has a breather port arranged to branch off from the fuel passage, and
the enlarged opening portion is formed on an opposite side to a location at which the breather port branches off from the fuel passage with respect to the axial direction of the fuel passage.

9. The fuel supply apparatus according to claim 8, wherein the enlarged opening portion is formed on a side of the nozzle guide where the fueling nozzle is inserted.

10. The fuel supply apparatus according to claim 9, wherein the nozzle guide has a protrusion formed along a fuel tank-side end of the opening.

11. The fuel supply apparatus according to claim 8, wherein the enlarged opening portion is formed on a fuel tank-side of the nozzle guide.

12. The fuel supply apparatus according to claim 11, wherein the nozzle guide has a protrusion formed along a fuel tank-side end of the opening.

13. The fuel supply apparatus according to claim 7, wherein the opening is formed at a corresponding location of the nozzle guide, and wherein the corresponding location corresponds to a gas sensor for the fueling nozzle inserted into the fuel supply apparatus.

* * * * *